United States Patent
Lange et al.

(10) Patent No.: US 10,940,934 B2
(45) Date of Patent: Mar. 9, 2021

(54) FLOOR ARRANGEMENT FOR A CABIN OF A VEHICLE

(71) Applicant: Airbus Operations GmbH, Hamburg (DE)

(72) Inventors: Roland Lange, Nottensdorf (DE); Andreas Heidtmann, Fredenbeck (DE)

(73) Assignee: Airbus Operations, GmbH, Hamburg (DE)

(*) Notice: Subject to any disclaimer, the term of this patent is extended or adjusted under 35 U.S.C. 154(b) by 387 days.

(21) Appl. No.: 16/123,472

(22) Filed: Sep. 6, 2018

(65) Prior Publication Data

US 2019/0077495 A1    Mar. 14, 2019

(30) Foreign Application Priority Data

Sep. 12, 2017  (DE) ............... 10 2017 216 077.2

(51) Int. Cl.
| | | |
|---|---|---|
| *B64C 1/18* | (2006.01) | |
| *B32B 3/10* | (2006.01) | |
| *B64D 11/00* | (2006.01) | |

(52) U.S. Cl.
CPC ....... *B64C 1/18* (2013.01); *B32B 3/10* (2013.01); *B32B 2605/18* (2013.01); *B64D 2011/0046* (2013.01)

(58) Field of Classification Search
CPC .............. B64C 1/18; B64C 1/20; B32B 3/266
See application file for complete search history.

(56) References Cited

U.S. PATENT DOCUMENTS

| | | | | |
|---|---|---|---|---|
| 2,275,037 | A | * | 3/1942 | Watter ............... B64C 1/18 52/578 |
| 2,412,778 | A | * | 12/1946 | Kosek ............... B64C 1/18 244/120 |

(Continued)

FOREIGN PATENT DOCUMENTS

| | | |
|---|---|---|
| DE | 10360809 A1 | 7/2005 |
| DE | 10360807 A1 | 9/2005 |
| GB | 2320183 A | 6/1998 |

OTHER PUBLICATIONS

German Search Report for corresponding German Application No. 10 2017 216 077.2, dated Feb. 9, 2018.

*Primary Examiner* — Brian M O'Hara
*Assistant Examiner* — Michael B. Kreiner
(74) *Attorney, Agent, or Firm* — Greer, Burns & Crain, Ltd.

(57) ABSTRACT

A floor arrangement for a cabin of a vehicle, in particular of an aircraft or spacecraft, comprises a carrier plate formed with a multiplicity of first fastening perforations and a multiplicity of reinforcing notches. The first fastening perforations are arranged one behind another in fastening rows at a uniform longitudinal distance. The fastening rows are oriented parallel at a uniform transverse distance from one another at an angle of orientation of 45° with respect to a longitudinal direction of the floor arrangement. The reinforcing notches run along the angle of orientation in a manner offset with respect to the fastening rows. A floor panel is formed with a multiplicity of second fastening perforations and is arranged above the carrier plate such that the second fastening perforations are arranged above the first fastening perforations to fasten cabin elements through the floor panel to the carrier plate.

16 Claims, 2 Drawing Sheets

(56) References Cited

U.S. PATENT DOCUMENTS

| | | | | |
|---|---|---|---|---|
| 3,578,274 A * | 5/1971 | Ginn | ............... | B64D 9/00 244/118.6 |
| 3,902,583 A * | 9/1975 | Laibson | ............... | B64C 1/20 193/35 MD |
| 4,000,870 A * | 1/1977 | Davies | ............... | B64C 1/20 410/92 |
| 4,824,050 A * | 4/1989 | Courter | ............... | B64C 1/20 108/55.1 |
| 4,875,645 A * | 10/1989 | Courter | ............... | B64C 1/20 244/137.1 |
| 5,755,163 A * | 5/1998 | Coats | ............... | B64C 1/20 108/53.5 |
| 5,827,022 A * | 10/1998 | Tovani | ............... | B64D 9/00 410/78 |
| 6,427,945 B1 * | 8/2002 | Bansemir | ............... | B64C 1/062 244/119 |
| 7,073,994 B2 * | 7/2006 | Huber | ............... | B64C 1/20 410/92 |
| 8,387,919 B2 * | 3/2013 | Huber | ............... | B64C 1/20 244/137.1 |
| 8,840,065 B2 * | 9/2014 | Panzram | ............... | B64C 1/20 244/118.1 |
| 8,899,521 B2 * | 12/2014 | Delahaye | ............... | B64C 1/18 244/119 |
| 9,481,467 B2 * | 11/2016 | Oleson | ............... | B64C 1/20 |
| 9,663,231 B2 | 5/2017 | Koncz | | |
| 10,307,313 B2 * | 6/2019 | Schroeder | ............... | A47B 96/067 |
| 10,773,784 B2 * | 9/2020 | Huber | ............... | B64C 1/20 |

* cited by examiner

FLOOR ARRANGEMENT FOR A CABIN OF A VEHICLE

CROSS-REFERENCES TO RELATED APPLICATIONS

This application claims the benefit of the German patent application No. 10 2017 216 077.2 filed on Sep. 12, 2017, the entire disclosures of which are incorporated herein by way of reference.

BACKGROUND OF THE INVENTION

The present invention relates to a floor arrangement for a cabin of a vehicle, in particular, of an aircraft or spacecraft.

Although usable in diverse applications, the present invention and the problem on which it is based will be explained in more detail with respect to passenger aircraft. However, the described devices can also be used in different vehicles and in all sectors of the transport industry, for example for road vehicles, for rail vehicles, for aircraft or for watercraft.

At present, floor assemblies are realized in cabins of passenger aircraft by a multiplicity of floor panels being laid together with fastening rails for the attaching of cabin elements. The fastening rails are typically designed here as metallic perforated rails which are fastened to a primary structure of the aircraft and are oriented along a longitudinal axis of the aircraft, cf., for example, the documents DE 103 60 809 A1 and DE 103 60 807 A1. In order to permit as flexible an attachment as possible, such perforated rails can be provided with regularly spaced-apart holes in which further connecting elements can be attachable at regular distances in a longitudinal direction of the rail. By means of the connecting elements, a multiplicity of cabin elements can then be fixed in the cabin of the passenger aircraft, for example passenger seats or further assemblies which are provided for use by the crew or the passengers of the aircraft. Assemblies of this type in an aircraft passenger cabin comprise, for example, storage cupboards, toilets, galleys, bar structures, partitions, etc., and are also referred to as monuments. However, the positioning possibilities of general cabin elements are considerably restricted by this configuration of the fastening rails. Furthermore, it would be desirable to be able also to repurpose a cabin layout in the short term so that, for example, the arrangement of the passenger seats or the monuments can be reconfigured rapidly and flexibly.

SUMMARY OF THE INVENTION

Against this background, the present invention is based on the object of finding solutions for a more flexible positioning of cabin elements in a cabin of a vehicle.

According thereto, a floor arrangement for a cabin of a vehicle, in particular of an aircraft or spacecraft, is provided. The floor arrangement comprises a carrier plate which is formed with a multiplicity of first fastening perforations and a multiplicity of reinforcing notches, wherein the first fastening perforations are arranged one behind another in fastening rows at a uniform longitudinal distance, wherein the fastening rows are oriented parallel at a uniform transverse distance from one another at an angle of orientation of 45° with respect to a longitudinal direction of the floor arrangement, and wherein the reinforcing notches run along the angle of orientation in a manner offset with respect to the fastening rows, and a floor panel which is formed with a multiplicity of second fastening perforations and is arranged above the carrier plate in such a manner that the second fastening perforations are arranged above the first fastening perforations in order to fasten cabin elements through the floor panel to the carrier plate.

Furthermore, an aircraft or spacecraft is provided with a floor arrangement according to the invention.

A concept on which the present invention is based consists in substantially facilitating the positioning of cabin assemblies by a special wavy floor structure being provided which permits a regular grid patterning of a floor with fastening points. The fastening points are formed here by perforations lying above one another of the carrier plate and of the floor panels, wherein any fastening means known to a person skilled in the art can be used for fastening cabin elements in the perforations, for example ball lock pins, cylinder nuts or the like. According to the invention, this is achieved by a geometrical arrangement of the waves at an angle of 45° with respect to the longitudinal axis of the vehicle. This angle permits the installation of two and consequently more fastening points located next to one another at a sufficiently large distance from one another. For this purpose, the carrier plate can be perforated as comprehensively and systematically as possible while the floor panel can ultimately be perforated only at selected points. However, depending on the intended use, the floor panel can basically also have an identical perforation. Cabin elements can thus also be fastened retrospectively at any time since the structure of the carrier plate provides a comprehensive fastening grid patterning at any time. The reinforcing notches of the carrier plate serve here firstly to impart a certain rigidity and robustness to the carrier plate and also to the floor arrangement. Secondly, the reinforcing notches act to a certain extent as spacers via which an installation space is created for the installation of fastening means in the fastening perforations. Furthermore, the geometrical consideration of the reinforcing notches means that they can serve as a possibility of fastening and/or a possibility of guiding cables, lines or the like. As a result, the flexibility of the positioning of cabin elements in a cabin of a vehicle is considerably increased, with a compact, flat and rigid floor structure being ensured at the same time. Furthermore, the floor arrangement according to the invention has a small number of individual parts and can be completely preassembled because of its sandwich-like construction. In order to connect cabin elements, no new fastening devices are necessary and instead the commercially available fastening means known to a person skilled in the art can be used.

According to a development, a multiplicity of bearers can furthermore be provided under the carrier plate, which bearers support the carrier plate on the reinforcing notches. The bearers can run, in particular, in the longitudinal direction of the floor arrangement. For example, the bearers can be fixedly connected to the reinforcing notches, for example can be welded thereto. By this means, the individual "waves" of the carrier plate are connected to one another, i.e., are statically linked to one another. The bearers themselves can in turn sit on cross members or other components of the primary structure of the vehicle and/or can be connected thereto.

According to a development, the carrier plate can be formed as a plate made from a metal material or as a fiber-reinforced plastic component. For example, the carrier plate can be a shaped metal plate which is perforated at regular intervals. In another example, the carrier plate can be formed from a plastic which is reinforced with carbon fibers or glass fibers.

According to a development, the reinforcing notches can be formed with a multiplicity of function perforations. The function perforations can serve a plurality of purposes here. For example, further elements, e.g., cables, lines, etc., can be guided through them in a space-saving manner. Also, the weight of the carrier plate can be reduced to a considerable extent by a correspondingly configured arrangement of the function perforations without the mechanical integrity thereof being significantly impaired.

According to a development, the function perforations can be oriented along the longitudinal direction of the floor arrangement.

According to a development, the first fastening perforations and the second fastening perforations can be designed for receiving ball lock pins. Ball lock pins contain a pin, at one end of which a pushbutton with a spring mechanism is formed and at the other end of which balls are provided which can be extended and retracted by actuation of the pushbutton, as a result of which the ball lock pin is unlocked or locked. Ball lock pins simplify the rapid connection of components and are therefore ideally suitable for marking out cabin elements. Ball lock pins can be manufactured, for example, with a metal material, i.e., a metal, a metal alloy or a metallic combination of materials, e.g., stainless steel, wherein the pushbutton can be manufactured from a plastic.

According to a development, a multiplicity of washers can furthermore be provided under the carrier plate for fastening the ball lock pins. Alternatively or additionally, underlay strips can be provided under the carrier plate for fastening the ball lock pins. The underlay strips and/or washers can be provided with third fastening perforations which can correspond to the first fastening perforations and/or to the second fastening perforations. The underlay strips and/or washers can be attached fixedly to a lower side of the reinforcing notches.

According to a development, the carrier plate can be designed with a multiplicity of secondary reinforcing notches. The secondary reinforcing notches can run along the angle of orientation parallel to the reinforcing notches. In addition to the primary reinforcing notches, the secondary reinforcing notches can contribute to further reinforcement of the carrier plate.

According to a development, the first fastening perforations can be arranged in such a manner that a uniform perforation distance of the first fastening perforations in the longitudinal direction of the floor arrangement and in a transverse direction of the floor arrangement is produced from an integral multiple of one inch.

The perforation distance of the first fastening perforations in the longitudinal direction and the transverse direction of the floor arrangement can be 3 inches.

According to a development, the longitudinal distance of the first fastening perforations in the fastening rows can be 2 inches. This gives rise to the possibility of positioning cabin elements in 1" steps, i.e., steps of an inch, within the floor plane in the longitudinal direction and the transverse direction of the floor arrangement.

According to a development, the transverse distance of the fastening rows can be between 2 inches and 3 inches. In particular, the transverse distance of the fastening rows can be 2.1 inches.

According to a development, a further carrier plate can furthermore be provided. The further carrier plate can be designed identically to the carrier plate. The two carrier plates can be arranged next to each other transversely with respect to the longitudinal direction of the floor arrangement. The fastening rows and the reinforcing notches of the further carrier plate can be oriented rotated by 90° with respect to the fastening rows and the reinforcing notches of the carrier plate in such a manner that the fastening rows and the reinforcing notches of the two carrier plates converge in a V-shaped manner. By this means, the floor arrangement is divided into a left and a right half, which halves are oriented at an opposed angle. The floor arrangement can therefore be arranged in such a manner that a passenger aircraft, for example a commercial aircraft with only a single cabin aisle, i.e., a single aisle aircraft, is separated at a center line. By this means, it is not only possible for the entire floor of the aircraft to be assembled, for example, with a 1" grid pattern. Furthermore, the rigidity of the entire fuselage structure of the aircraft can be improved by the carrier plates being connected fixedly to cross members of the primary structure of the aircraft, for example via longitudinally oriented bearers, such that the cross members are subjected to a tensile and/or compressive stress depending on orientation in the event of an impact or a knock.

The above refinements and developments can be combined as desired with one another if expedient. Further possible refinements, developments and implementations of the invention also include combinations, which are not explicitly mentioned, of features of the invention described previously or below with regard to the exemplary embodiments. In particular, a person skilled in the art will also add individual aspects here as improvements or supplements to the respective basic form of the present invention.

BRIEF DESCRIPTION OF THE DRAWINGS

The present invention is explained in more detail below with reference to the exemplary embodiments indicated in the schematic figures, in which.

Figure 1:
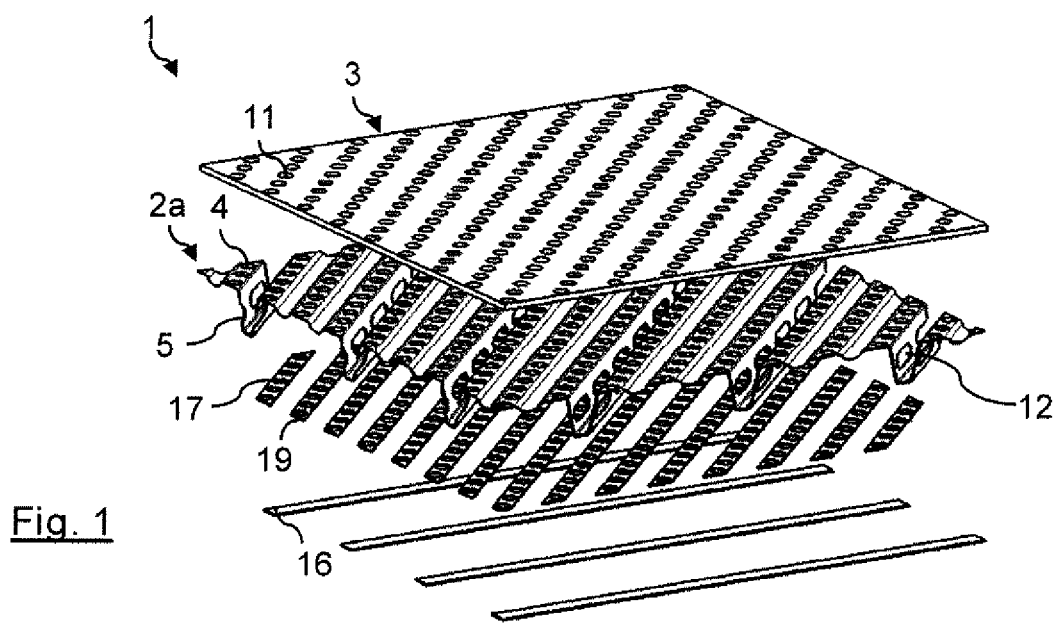
FIG. 1 shows a schematic exploded view of a floor arrangement according to an embodiment of the invention.

The attached figures are intended to provide further understanding of the embodiments of the invention. They illustrate embodiments and serve in conjunction with the description to clarify principles and concepts of the invention. Other embodiments and many of the advantages mentioned arise with regard to the drawings. The elements of the drawings are not necessarily shown true to scale with respect to one another.

In the figures of the drawing, identical, functionally identical and identically acting elements, features and components—unless stated otherwise—are each provided with the same reference numerals.

DETAILED DESCRIPTION OF THE PREFERRED EMBODIMENTS

Figure 5:
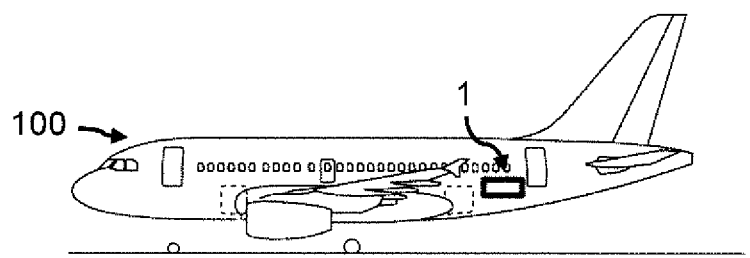
FIG. 5 shows a schematic side view of an aircraft with the floor arrangement from FIG. 1.

FIG. 1 shows a schematic exploded view of a floor arrangement 1 according to an embodiment of the invention. FIG. 5 shows a schematic side view of an aircraft 100, for example a passenger aircraft with just a single cabin aisle, i.e., a single aisle aircraft, with the floor arrangement 1 from FIG. 1.

Figure 2:
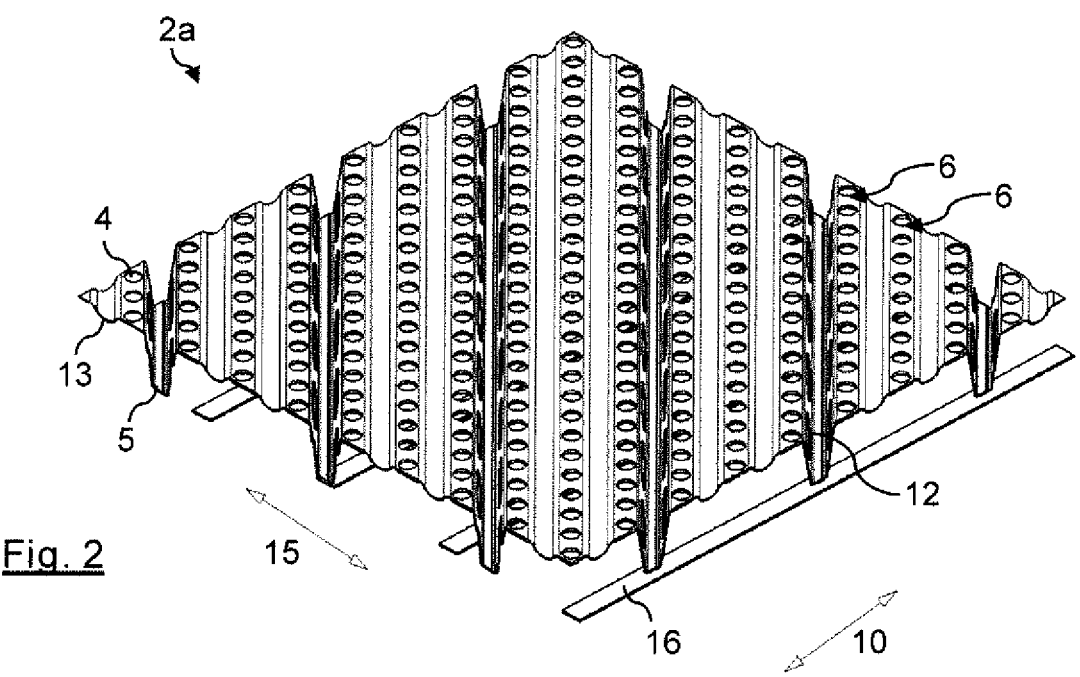
FIG. 2 shows a schematic perspective view of a carrier plate from the floor arrangement according to FIG. 1 obliquely from above.
Figure 3:
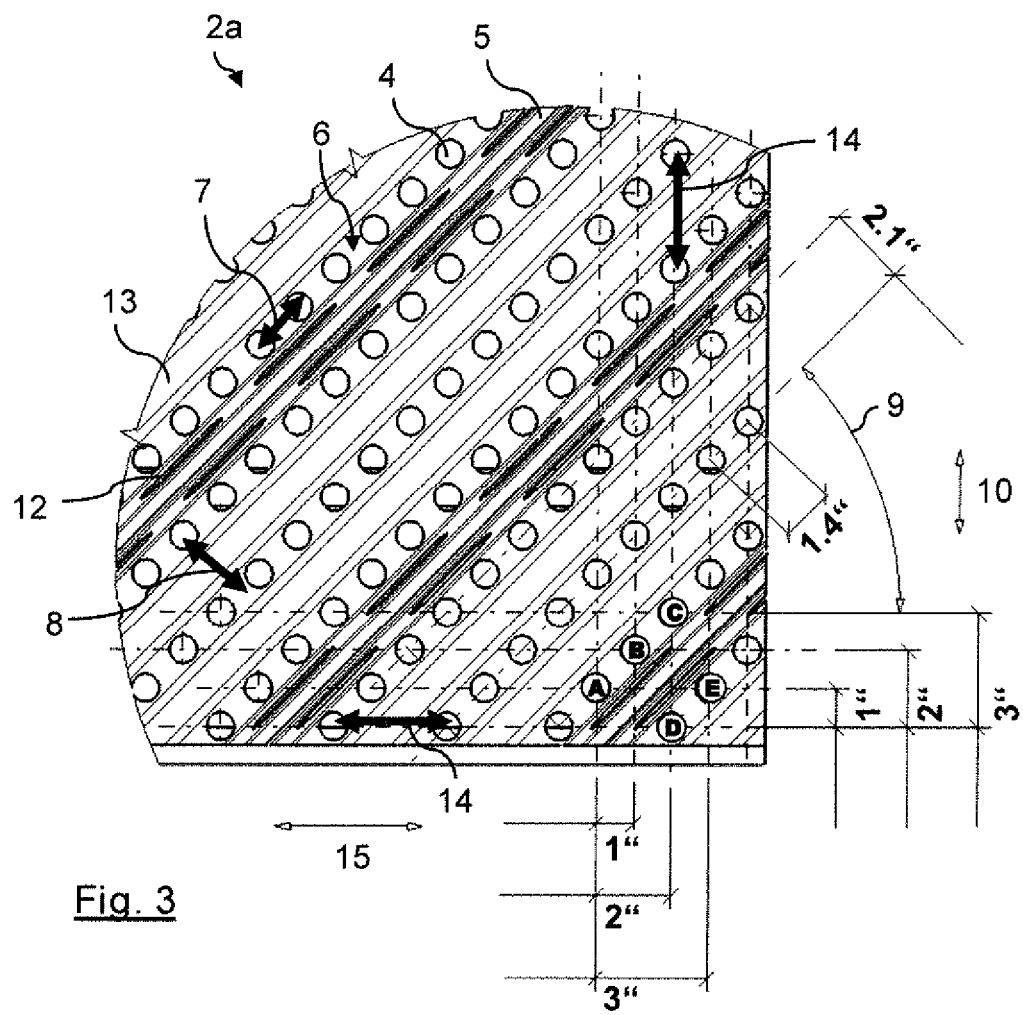
FIG. 3 shows a schematic top view of the carrier plate from FIG. 2.

The floor arrangement 1 comprises a carrier plate 2*a* and a floor panel 3 which is arranged on the carrier plate 2*a*. FIG. 2 shows a schematic perspective view of a carrier plate 2*a* from the floor arrangement 1 from FIG. 1. FIG. 3 adds hereto a schematic top view to the carrier plate 2*a* from FIG. 2. The carrier plate 2*a* is formed with a multiplicity of first fastening perforations 4, for example holes, and a multiplicity of reinforcing notches 5 which are arranged and designed in a manner corresponding to a wave-like shape (see further below). The floor panel 3 is correspondingly formed with a multiplicity of second fastening perforations 11. During the installation of the floor arrangement 1, the floor panel 3 is arranged above the carrier plate 2*a* in such a manner that the second fastening perforations 11 are arranged above the first fastening perforations 4 in order to fasten cabin elements. In this embodiment, the first fastening perforations 4 and the second fastening perforations 11 are dimensioned or designed for receiving ball lock pins which are guided through the second fastening perforations 11 of the floor panel 3 and the first fastening perforations 4 of the carrier plate 2*a* in order to mount cabin elements in a desired position on the floor arrangement 1. For this purpose, the floor arrangement 1 comprises a multiplicity of washers and/or underlay strips 17 under the carrier plate 2*a* for fastening the ball lock pins. The underlay strips and/or washers 17 can be provided with third fastening perforations 19 which can correspond to the first fastening perforations 4 or to the second fastening perforations 11. The underlay strips and/or washers 17 can be fixedly attached to a lower side of the reinforcing notches 5. The washers or underlay strips 17 are oriented in a manner corresponding to the first and second fastening perforations 4, 11, i.e., parallel to the reinforcing notches 5.

Furthermore, the floor arrangement has a multiplicity of bearers 16 under the carrier plate 2*a*, which bearers support the carrier plate 2*a* on the reinforcing notches 5. The bearers 16 in turn can sit on cross members (not illustrated, cf. FIG. 4) of a primary structure of the aircraft 100. In the present case, the carrier plate 2*a* is by way of example a shaped plate made from metal, which is welded to the bearers 16.

The floor panel 3 can be formed, for example, from a fiber-reinforced plastic.

Specifically, the first fastening perforations 4 are arranged one behind another in fastening rows 6 at a uniform longitudinal distance 7. In this embodiment, the longitudinal distance 7 of the first fastening perforations 4 in the fastening rows 6 is $\sqrt{2}$ inches, i.e., of approximately 1.4 inches (cf. FIG. 3). This creates a positioning grid pattern of one inch in a plane of the floor arrangement 1, the plane extending in a longitudinal direction 10 and a transverse direction 15 of the floor arrangement 1 (this will be explained in more detail further below). The fastening rows 6 are oriented in parallel at a uniform transverse distance 8 from one another at an angle of orientation 9 of 45° with respect to the longitudinal direction 10 of the floor arrangement 1, i.e., ultimately with respect to a longitudinal direction of the aircraft 100. In this embodiment, the transverse distance 8 of the fastening rows 6 is by way of example 2.1 inches (cf. FIG. 3). The reinforcing notches 5 run in a manner offset with respect to the fastening rows 6 along the angle of orientation 9, i.e., likewise at an angle of 45° with respect to the longitudinal direction 10 of the floor arrangement 1. The first fastening perforations 4 are arranged in such a manner that a uniform perforation distance 14 of three inches of the first fastening perforations 4 is produced both in the longitudinal direction 10 of the floor arrangement and in the transverse direction 15 of the floor arrangement 1 (cf. FIG. 3 at the bottom on the right where examples of values for the distances are indicated in inches (1 inch, 2 inches and 3 inches, i.e., 1", 2" and 3").

The fastening rows 6 and the reinforcing notches 5 are arranged parallel to one another at regular fixed distances from one another in a certain analogy to the front of a flat wave. The reinforcing notches 5 serve here as spacers in order to ensure the installation space required for installing the ball lock pins. Furthermore, they serve for reinforcing the carrier plate 2*a* and therefore the floor arrangement 1. On account of their particular geometrical configuration, the reinforcing notches 5 can furthermore serve for guiding cables, lines or the like. For this purpose, the reinforcing notches 5 are additionally formed with a multiplicity of function perforations 12 which are oriented along the longitudinal direction 10 of the floor arrangement 1. In addition to the possibility of the passage of cables and lines, these additional perforations of the reinforcing notches 5 serve to save weight and to configure the entire floor arrangement 1 to be as lightweight as possible while simultaneously having a high degree of stability and rigidity. In order to further increase the rigidity of the floor arrangement 1, a multiplicity of secondary reinforcing notches 13 are formed in the carrier plate 2*a* along the angle of orientation 9 parallel to the reinforcing notches 5, i.e., likewise in a manner corresponding to a wave pattern. Both the reinforcing notches 5 and the secondary reinforcing notches 13 can be designed with a fixed height of the wave crest, i.e., with a fixed amplitude. Alternatively, of course, it remains left to a person skilled in the art to appropriately geometrically design the reinforcing notches 5 and/or the secondary reinforcing notches 13 in order to achieve certain advantages depending on the intended use. In the exemplary embodiment shown, the reinforcing notches 5 and the secondary reinforcing notches 13 have a different wave height. The reinforcing notches 5 and the secondary reinforcing notches 13 can likewise also be formed with an identical wave height.

With regard to FIG. 3, the geometrical arrangement of the fastening perforations 4 will be briefly explained and the purpose thereof clarified (cf. in particular FIG. 3 at the bottom on the right). For example, first of all point A can be selected as the installation point. If it is then required to displace the installation point by an inch, it is possible, for example, to deviate to point B which is at an inch distance from point A both in the longitudinal direction 10 and in the transverse direction 15 (the longitudinal distance 7 of the individual fastening perforations 4 is $\sqrt{2}$ inches). A displacement by two inches in the transverse direction 15 is possible by, for example, either point C or point D being selected, which corresponds to a displacement of one or two inches in the longitudinal direction 10. A displacement of three inches in the transverse direction 15 can correspondingly be carried out via point E, wherein a displacement in the longitudinal direction 10 is not necessary because of the perforation distance 14 of three inches. As a result, a highly flexible grid patterning of the carrier plate 2*a* in the plane of the floor arrangement 1 is therefore provided which affords considerable freedom in the positioning in relation to conventional floor arrangements. In this case, the specific dimensioning of the floor arrangement 1 and, in particular, of the carrier plate 2*a* as shown in FIGS. 1-3 should be understood as being purely by way of example. A person skilled in the art will correspondingly advantageously select the perforation distances 14, the longitudinal distances 7 and/or the transverse distances 8 of the fastening perforations 4, 11 and of the fastening rows 6 depending on the use, and is not restricted here to the specific embodiment described.

As a result, a compact, flat and rigid floor arrangement 1 is provided which affords a high degree of flexibility for the positioning of cabin elements. Furthermore, the floor arrangement according to the invention has a small number of individual parts and can be completely preassembled because of its sandwich-like design.

Figure 4:
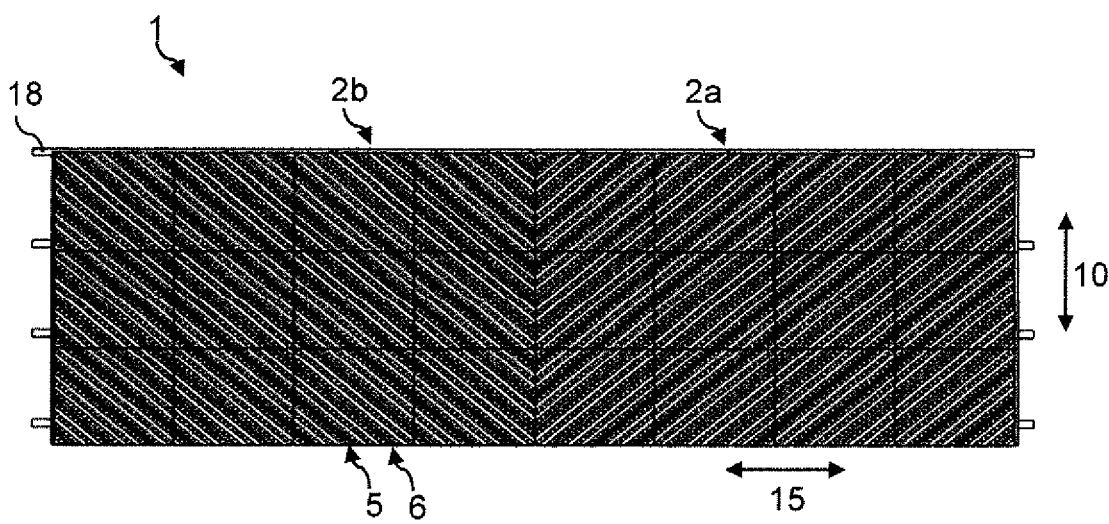
FIG. 4 shows a schematic top view of a floor arrangement according to a further embodiment of the invention.

FIG. 4 shows a schematic top view of a floor arrangement 1 according to a further embodiment of the invention. The floor arrangement 1 comprises a carrier plate 2a corresponding to the embodiment in FIGS. 1-3. In addition, the floor arrangement 1 has a further carrier plate 2b which is identical to the carrier plate 2a in FIGS. 1-3. The two carrier plates 2a, 2b are arranged next to each other transversely with respect to the longitudinal direction 10 of the floor arrangement 1. The fastening rows 6 and the reinforcing notches 5 of the further carrier plate 2b are oriented here rotated by 90° with respect to the fastening rows 6 and the reinforcing notches 5 of the carrier plate 2a in such a manner that the fastening rows 6 and the reinforcing notches 5 of the two carrier plates 2a, 2b converge in a V-shaped manner. By this means, the floor arrangement 1 is divided in the center into a left and a right half. The two carrier plates 2a, 2b are fastened to cross members 18 of the primary structure of the aircraft 100 via bearers 16. Since the two carrier plates 2a, 2b are each rotated by 45° in relation to the longitudinal direction 10, a 1-inch grid pattern is therefore produced for both carrier plates 2a, 2b both in the longitudinal direction 10 and also in the transverse direction 15. Furthermore, the rigidity of the entire fuselage structure of the aircraft 100 is improved by the bearers 16 absorbing tensile forces and/or compressive forces from the cross members 18 or passing on the forces.

In the preceding detailed description, various features for improving the stringency of the illustration have been combined in one or more examples. However, it should be clear here that the above description is merely illustrative, and does not have a restricted nature in any way. It serves to cover all the alternatives, modifications and equivalents of the various features and exemplary embodiments. Many other examples will be clear immediately and directly to a person skilled in the art on the basis of his/her specialist knowledge in view of the above description.

The exemplary embodiments have been selected and described in order to be able to present the principles underlying the invention and their application possibilities in practice as well as possible. As a result, specialist personnel can modify and use the invention and its various exemplary embodiments in an optimum way with respect to the intended purpose of use. In the claims and the description, the terms "including" and "having" are used as neutral terms for the corresponding term "comprising."

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A floor arrangement for a cabin of a vehicle, comprising:
   a carrier plate formed with a multiplicity of first fastening perforations and a multiplicity of reinforcing notches,
      wherein the first fastening perforations are arranged one behind another in fastening rows at a uniform longitudinal distance,
      wherein the fastening rows are oriented parallel at a uniform transverse distance from one another at an angle of orientation of 45° with respect to a longitudinal direction of the floor arrangement, and
      wherein the reinforcing notches run along the angle of orientation in a manner offset with respect to the fastening rows; and
   a floor panel formed with a multiplicity of second fastening perforations and being arranged above the carrier plate such that the second fastening perforations are arranged above the first fastening perforations to fasten cabin elements through the floor panel to the carrier plate.

2. The floor arrangement according to claim 1, further comprising a multiplicity of bearers under the carrier plate, which bearers support the carrier plate on the reinforcing notches.

3. The floor arrangement according to claim 1, wherein the carrier plate is formed as a plate made from a metal material.

4. The floor arrangement according to claim 1, wherein the carrier plate is formed as a plate made from a fiber-reinforced plastic component.

5. The floor arrangement according to claim 1, wherein the reinforcing notches are formed with a multiplicity of function perforations.

6. The floor arrangement according to claim 5, wherein the function perforations are oriented along the longitudinal direction of the floor arrangement.

7. The floor arrangement according to claim 1, wherein the first fastening perforations and the second fastening perforations are configured to receive ball lock pins.

8. The floor arrangement according to claim 7, further comprising a multiplicity of washers under the carrier plate with third fastening perforations for fastening the ball lock pins.

9. The floor arrangement according to claim 7, further comprising a multiplicity of underlay strips under the carrier plate with third fastening perforations for fastening the ball lock pins.

10. The floor arrangement according to claim 1, wherein the carrier plate is configured with a multiplicity of secondary reinforcing notches which run along the angle of orientation parallel to the reinforcing notches.

11. The floor arrangement according to claim 1, wherein the first fastening perforations are arranged in such a manner that a uniform perforation distance of the first fastening perforations in the longitudinal direction of the floor arrangement and in a transverse direction of the floor arrangement is produced from an integral multiple of one inch.

12. The floor arrangement according to claim 11, wherein the perforation distance of the first fastening perforations in the longitudinal direction and the transverse direction of the floor arrangement is 3 inches.

13. The floor arrangement according to claim 1, wherein the longitudinal distance of the first fastening perforations in the fastening rows is √2 inches.

14. The floor arrangement according to claim 1, wherein the transverse distance of the fastening rows is between 2 inches and 3 inches.

15. The floor arrangement according to claim 1, further comprising a further carrier plate configured identically to the carrier plate, wherein the two carrier plates are arranged next to each other transversely with respect to the longitudinal direction of the floor arrangement, and wherein the fastening rows and the reinforcing notches of the further carrier plate are oriented rotated by 90° with respect to the fastening rows and the reinforcing notches of the carrier plate such that the fastening rows and the reinforcing notches of the two carrier plates converge in a V-shaped manner.

16. An aircraft or spacecraft with a floor arrangement according to claim 1.

* * * * *